United States Patent
Batio

[19]

[11] Patent Number: 6,081,207
[45] Date of Patent: *Jun. 27, 2000

[54] MULTIPURPOSE, FOLDING, PORTABLE COMPUTER

[76] Inventor: Jeffry Batio, 1954 First St., Suite 207, Highland Park, Ill. 60035

[*] Notice: This patent is subject to a terminal disclaimer.

[21] Appl. No.: 09/264,545

[22] Filed: Mar. 5, 1999

Related U.S. Application Data

[63] Continuation-in-part of application No. 08/969,006, Nov. 12, 1997, Pat. No. 5,949,643.

[51] Int. Cl.[7] .................................................. H03K 17/94
[52] U.S. Cl. ............................ 341/20; 341/2 L; 345/168; 361/680; 361/681
[58] Field of Search ....................... 341/20, 22; 361/680, 361/681; 345/168, 173; 400/473, 474

[56] References Cited

U.S. PATENT DOCUMENTS

| | | | |
|---|---|---|---|
| 4,825,395 | 4/1989 | Kinser | 361/680 |
| 5,128,662 | 7/1992 | Failla | 345/1 |
| 5,267,127 | 11/1993 | Pollitt | 361/680 |
| 5,278,779 | 1/1994 | Conway | 341/22 |
| 5,440,502 | 8/1995 | Register | 361/680 |
| 5,467,102 | 11/1995 | Kuno | 345/1 |
| 5,594,619 | 1/1997 | Miyagawa | 361/681 |
| 5,644,469 | 7/1997 | Shioya | 361/681 |
| 5,668,570 | 9/1997 | Ditzik | 345/173 |
| 5,673,170 | 9/1997 | Register | 361/681 |
| 5,682,182 | 10/1997 | Tsubosaka | 345/173 |
| 5,687,939 | 11/1997 | Moscovitch | 248/122.1 |
| 5,712,760 | 1/1998 | Coulon | 361/680 |
| 5,733,056 | 3/1998 | Meagher | 400/472 |
| 5,768,096 | 6/1998 | Williams | 361/681 |
| 5,926,364 | 7/1999 | Kardis | 361/681 |

*Primary Examiner*—Michael Horabik
*Assistant Examiner*—Albert K. Wong
*Attorney, Agent, or Firm*—Hamman & Benn

[57] ABSTRACT

A retrofitting, folding, portable keyboard for a notebook computer consists of two, pivotally-hinged halves. The two halves are hinged so that may be assume a perfectly flat, horizontal position, or, alternatively, a laterally raised and sloping configuration that provides an enhanced, ergonometric configuration to the user. Each half has its own set of keys and space bar. The keyboard of the invention has its own pointing device that takes over the pointing function of the pointing device of the dedicated keyboard provided with the notebook computer. The portable, folding keyboard of the invention also has a joystick-adapter by which a conventional joystick may be operatively coupled to the notebook computer by which games may be played. Four, bottom, pivotal feet support the keyboard on and/or above the existing keyboard provided with the notebook computer. A carrying case is provided in which the folded-up keyboard may be stored and transported. Also provided is a dual split screen, where each half of the split screen is pivotally mounted for universal rotation.

4 Claims, 6 Drawing Sheets

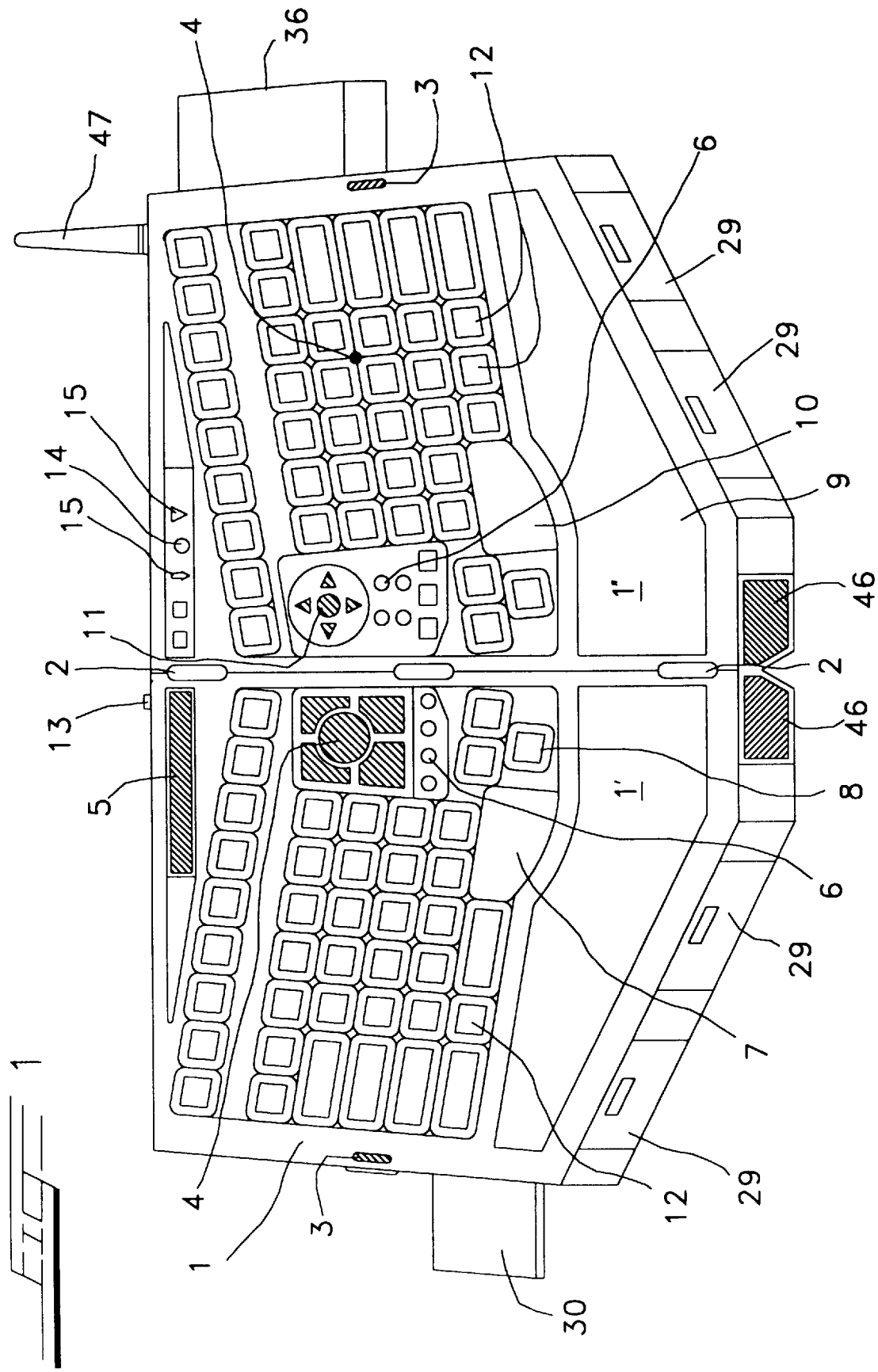

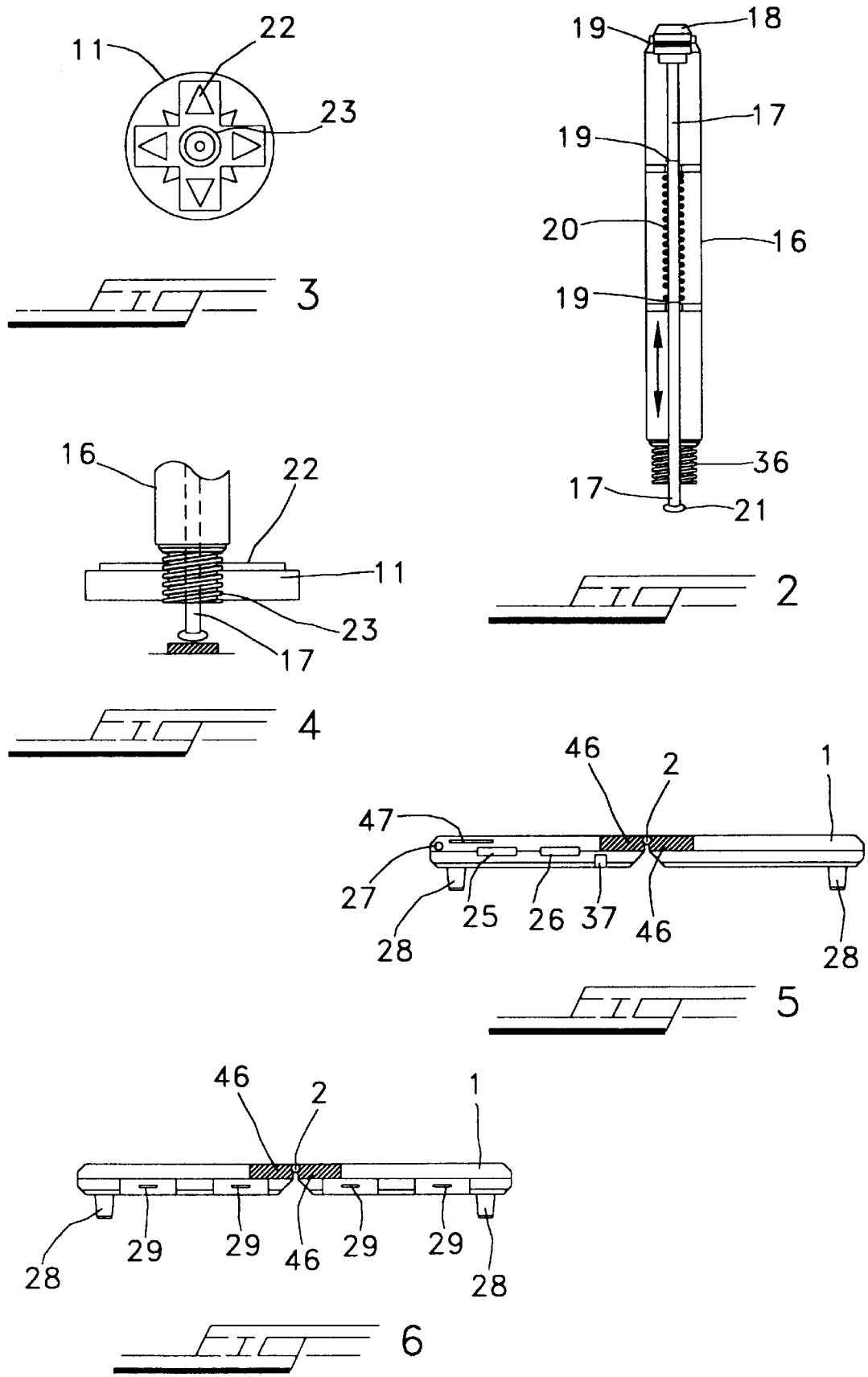

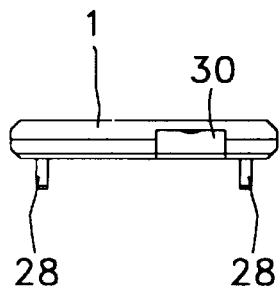
FIG. 7
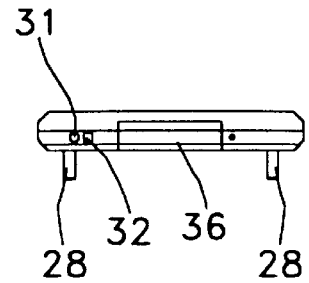
FIG. 8
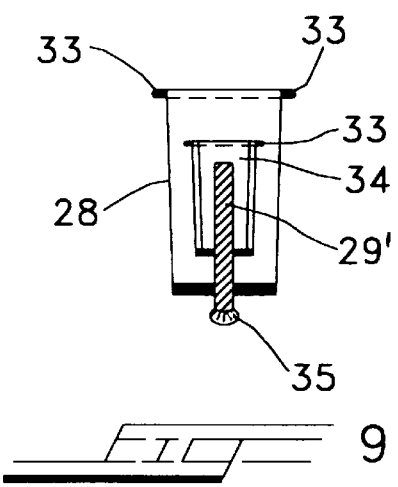
FIG. 9
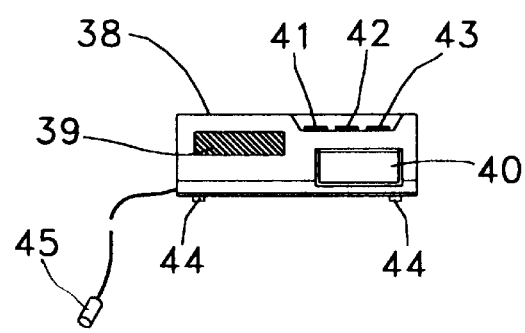
FIG. 11
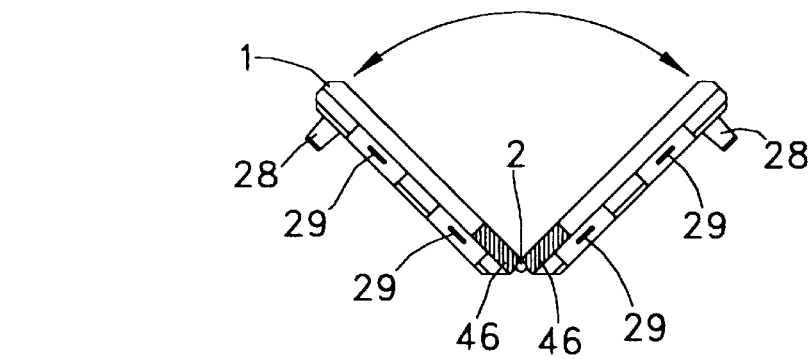
FIG. 10

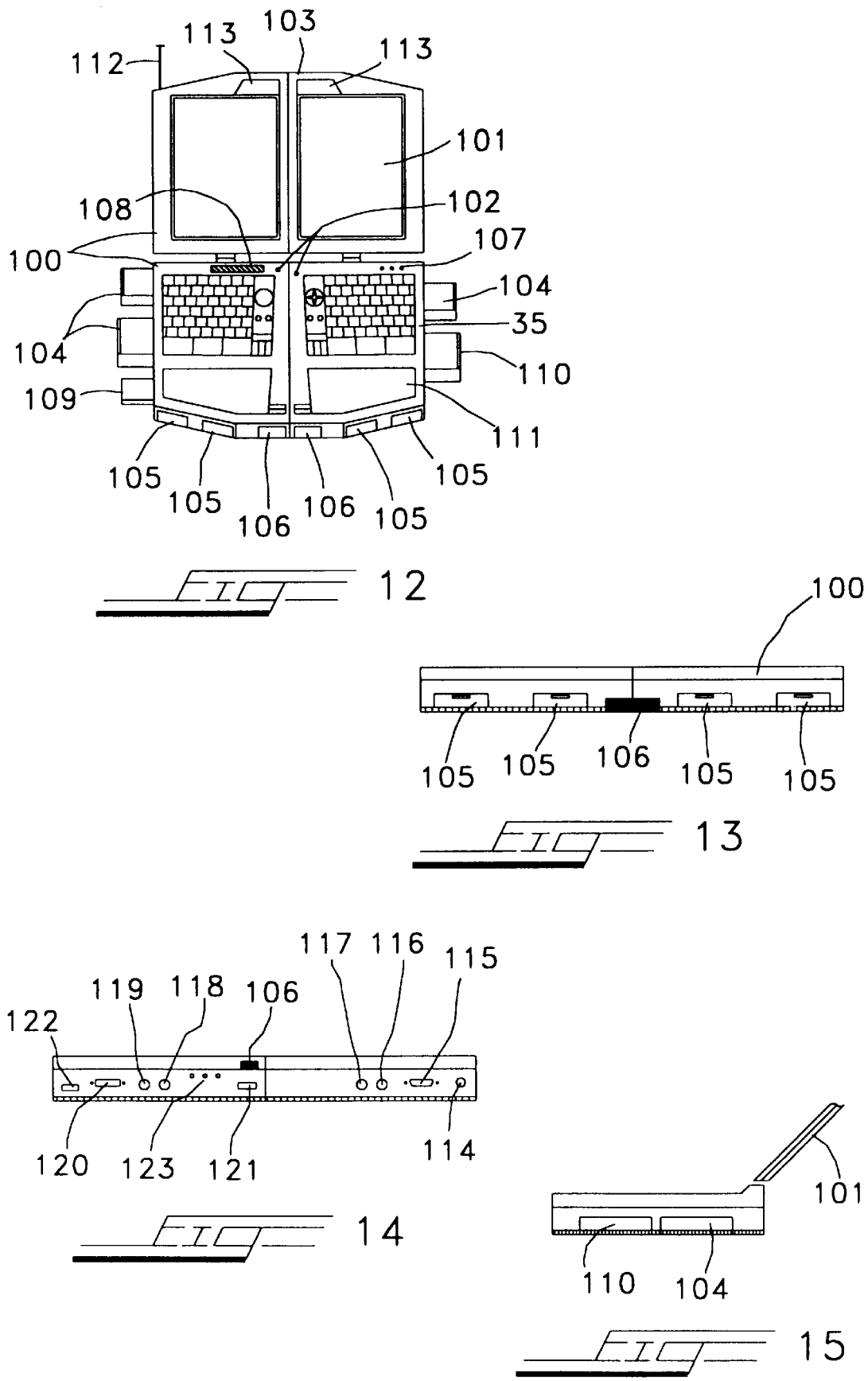

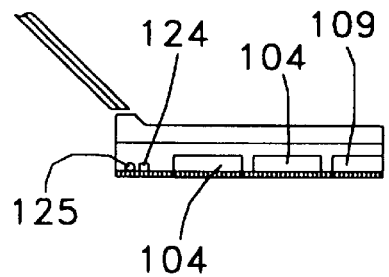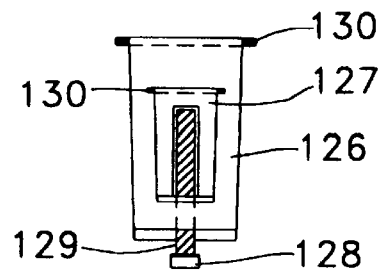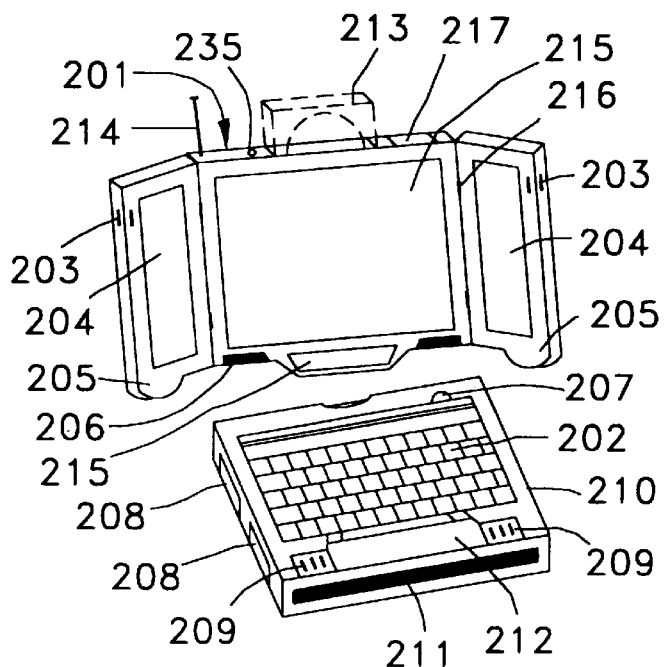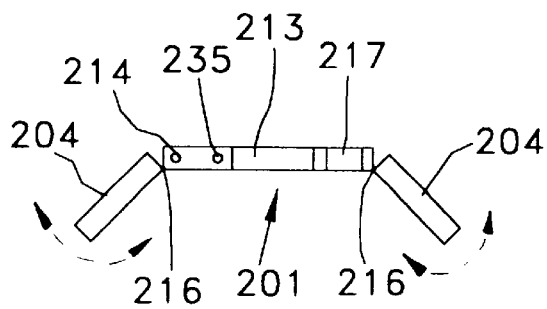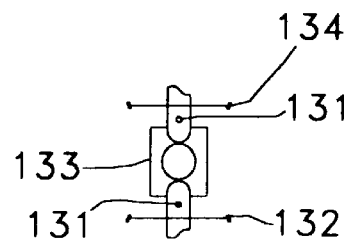

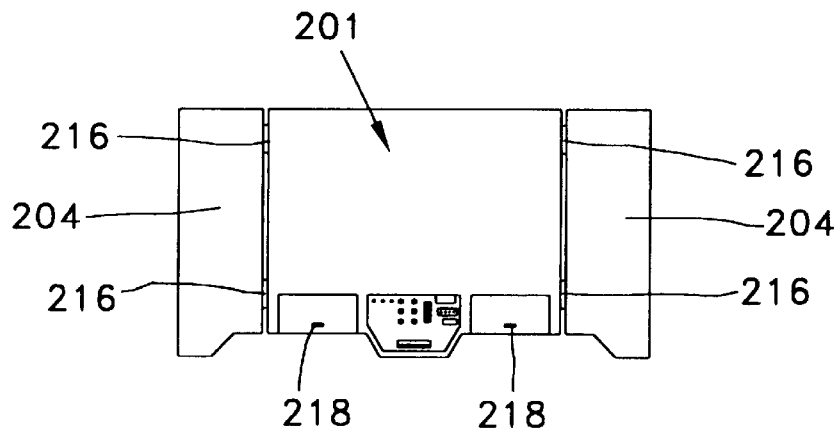
FIG. 21
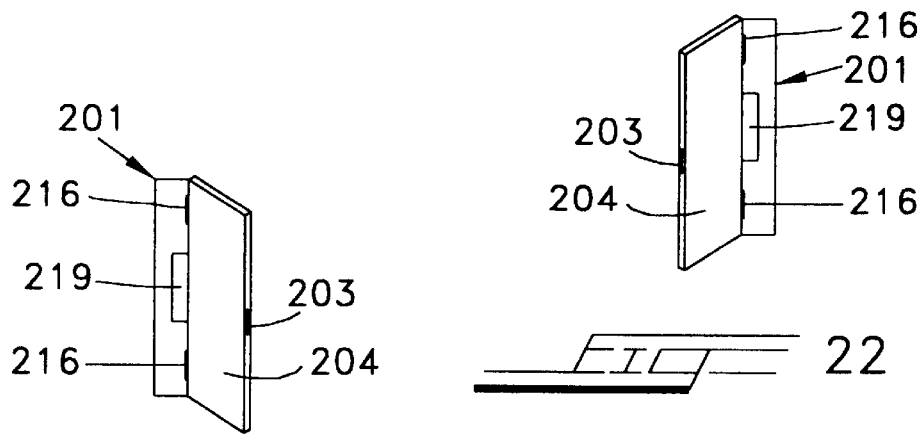
FIG. 22
FIG. 23
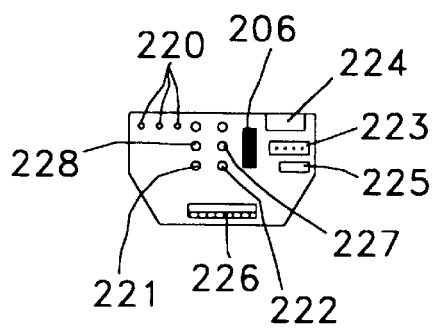
FIG. 24
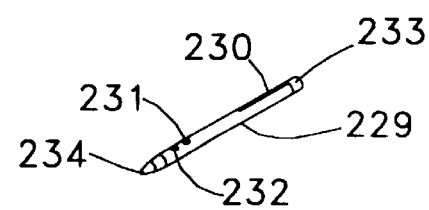
FIG. 25

MULTIPURPOSE, FOLDING, PORTABLE COMPUTER

CROSS REFERENCE TO RELATED APPLICATION

This is a continuation of application Ser. No. 08/969,006 filed on Nov. 12, 1997 now U.S. Pat. No. 5,949,643.

The present invention is based on Provisional application No. 60/031,135, filed on Nov. 18, 1996.

BACKGROUND OF THE INVENTION

The present invention is directed to a keyboard for use with computers or as a self-contained computer itself. The keyboard of the invention, in one use, may be used as an auxiliary keyboard that is intended to be overlaid on an existing, notebook-computer keyboard so as to provide a full-sized keyboard for a notebook computer. In another use, the same portable, foldable keyboard of the invention may be used with split screens detachably pivoted to the keyboard, with the keyboard having its own microprocessor, whereby both the keyboard with split screens may be folded and stored into a relatively small space. In still another use, the computer keyboard of the invention is provided with two independent microprocessors, where one folding half of the keyboard has a dedicated microprocessor for use as a notebook computer, while the other folding half of the keyboard has another, independent microprocessor that may dedicated to video games, or, alternatively, to the control of a set-top converter box that allows access to the Internet via the TV cable system.

Portable, notebook computers serve the positive function of providing a portable, folding computer, which means they must be relatively small in size. This size constraint means that the integral keyboard provided with the notebook computer is, also, of small size as compared to a full-size keyboard associated with minicomputers. The smaller-size keyboards of notebook computers make it more difficult to use, decreases the speed at which one may type on it, and promotes fatigue and strain to the hands and fingers.

It is known to provide a notebook computer with a folding keyboard that when unfolded provides a full-size keyboard. Examples of such a notebook computer with a folding keyboard are is disclosed in U.S. Pat. Nos. 5,267,127 and 5,278,779. However, these prior-art, folding keyboards for notebook computers are the primary, integral, dedicated, and sole keyboard of the notebook computer with which they are associates, and do not, and cannot, retrofit an existing notebook computer with a non-folding keyboard to one with a folding keyboard that opens up to a full-size keyboard. The use of split or multi-sectioned screens for a portable computer is also known; examples of such are disclosed in U.S. Pat. Nos. 5,128,662 and 5,467,102.

All of the prior-art portable and notebook computers are highly-complex, sophisticated systems, the keyboards of which are dedicated for use simply as an input device alone to the computer. It is the primary objective of the present invention to provide a computer keyboard that serves not only the function as a conventional input device, but also serves a plurality of other functions. These other functions are: An auxiliary, folding notebook keyboard that may readily and easily retrofitted over an existing notebook computer's keyboard, in order to provide the notebook computer with a folding, full-size keyboard; a stand-alone, independent portable computer, where the keyboard has its own, dedicated microprocessor, with a folding, split-screen monitor detachable, pivotally mounted to the keyboard; a stand-alone portable computer having a second, independent microprocessor associated with one half of the folding key board, whereby the second keyboard-half with its own microprocessor may be dedicatingly used for playing video games, or for controlling the set-top box converter for accessing the Internet over the TV cable system. The keyboard of the invention is readily and easily foldable into a relatively small volume, and in those uses where other parts are coupled to it, such as a split-screen monitor, and the like, the other parts are also foldable and/or readily and compactly stored along with the keyboard itself in a storage-carrying case.

SUMMARY OF THE INVENTION

It is, therefore, the primary objective of the present invention to provide a portable, folding keyboard for use with a notebook, or laptop, computer, that may also be used on its own as a portable computer, which keyboard, when used with another portable computer, will retrofit that computer to one that has a full-size keyboard.

It is another objective of the present invention to provide such a retrofitting, portable, folding keyboard for a notebook, or laptop, computer that has its own, integral pointing device built in, so that all of the functions previously performed by the originally-provided keyboard of the notebook computer may now be performed by the retrofitting, portable, folding keyboard of the invention.

It is another objective of the present invention to provide such a retrofitting, portable, folding keyboard for a notebook, or laptop, computer that has its own gamepad and joystick built with its own firing device, to thus provide a notebook computer with both a gamepad and joystick for playing video games.

It is, also, an objective of the present invention to provide a retrofitting, portable, folding keyboard for a notebook, or laptop, computer that is easily stored and carried in its own carrying case.

It is an objective of the present invention to provide a retrofitting, portable, folding keyboard for a notebook, or laptop, computer that is ergonomically correct, so that the user will no experience fatigue as readily as compared to other keyboards.

It is, also, an objective of the present invention to provide a retrofitting, portable, folding keyboard for a notebook, or laptop, computer that is provided with fold-down supporting feet that allow the retrofitting, portable, folding keyboard to be overlaid on the existing keyboard of the notebook computer, such that the supporting feet are supported on a table top or directly on the surface of the existing keyboard of the notebook computer, if space-constraints are a problem.

It is another objective of the present invention to provide a retrofitting, portable, folding keyboard for a notebook, or laptop, computer that is provided with its own, dedicated microprocessor, whereby the keyboard itself serves as a self-contained notebook, or portable, computer.

It is yet another objective of the present invention to provide such a retrofitting, portable, folding, self-contained keyboard that is provided with two, independent, dedicated microprocessors, whereby the keyboard itself serves as a self-contained notebook, or portable, computer by means of the first microprocessor, and also serves as a dedicated video game device by means of the second microprocessor, the keyboard having its own split-screen monitor detachable pivoted thereto, in the preferred embodiment.

It is another objective of the present invention to provide such a retrofitting, portable, folding, self-contained keyboard that is provided with an IF communication system operatively associated with at least one dedicated microprocessor for controlling a set-top box converter allowing access to the Internet by means of the TV cable system.

It is yet another objective of the present invention to provide such a retrofitting, portable, folding, self-contained keyboard that is provided with two, independent, dedicated microprocessors, whereby the keyboard itself serves as a self-contained notebook, or portable, computer by means of the first microprocessor, and also serves as a dedicated Internet-access device by means of the second microprocessor, the second microprocessor controlling a set-top box converter allowing access to the Internet by means of the TV cable system.

In all of the embodiments of the invention, the folding, portable, notebook-computer keyboard of the invention consists of two, pivotally-hinged halves. The two halves are hinged so that may be assume a perfectly flat, horizontal position, or, alternatively, a laterally raised and sloping configuration that provides an enhanced, ergonometric configuration to the user. Each half has its own set of keys and space bar, whereby the two sets of keys together comprise at least all of the keys of a standard keyboard; preferably, the keyboard has additional keys for dedicated use, such as for playing video games. The keyboard of the invention has its own pointing device that takes over the pointing function of the pointing device of the dedicated keyboard provided with the notebook computer, when the keyboard of the invention is used as an auxiliary, retro-fitting keyboard for providing a notebook computer with a full-size keyboard. The portable, folding keyboard of the invention also has a gamepad for use in playing video games, which gamepad may be coupled to a standard notebook or PC computer for use in playing the video games on those computers, or, alternatively, when the keypad of the invention has its own dedicated microprocessor, the gamepad is operatively associated therewith. Associated with the gamepad is a joystick-adapter by which a conventional joystick may be operatively coupled to the notebook computer via the gamepad by which video games may be played. Four, bottom, pivotal feet support the keyboard on and/or above the existing keyboard provided with the notebook computer. The forward portion of each half of the folding, portable, notebook-computer keyboard of the invention has a storage compartment, in which items may be stored. Flip-up wrist rests are also provided at the site of the storage compartments. A carrying case is provided in which the folded-up keyboard may be stored and transported.

The keypad of the invention, in addition to serving as an auxiliary keypad to an existing, conventional notebook computer, or the like, is, one embodiment, also a self-contained unit that is a notebook, or portable, computer in its own right. Thus, the keypad has at least one microprocessor to which inputs from the keys of the keypad are achieved. A detachably-mounted screen or monitor is provided, which, when mounted, is pivotally connected to the housing of the keypad. Preferably, the screen is comprised of a plurality of sections pivoted to each other, to allow for collapsing the screen into a small volume flat on itself and flat against the keyboard.

In another embodiment, the keypad of the invention is provided with another microprocessor. In this embodiment, the first microprocessor performs all of the operations required for a notebook computer, while the second microprocessor is dedicated to the playing of video games, such as "NINTENDO", etc. In this embodiment, the second, video-game microprocessor is associated with one half of the keypad, and access a CD-player storing the games. In this embodiment, the use of a split-screen monitor will allow two players to play with each screen-section displaying a player's game.

In any of the embodiments, the keypad also has RF receivers sensors and transmitters for controlling a set-top control box for accessing the Internet via the cable TV system.

BRIEF DESCRIPTION OF THE DRAWINGS

The invention will be more readily understood with reference to the accompanying drawing, wherein:

FIG. 1 is a plan view of the foldable, portable keypad having standard, enlarged-sized keys that is used for retro-fitting to a portable, notebook or laptop computer;

FIG. 2 is an elevational, cross-sectional view of the joystick attachment;

FIG. 3 is a plan view of the game-pad and arrow key of the keypad with which the joystick attachment is used;

FIG. 4 is an elevational, cross-sectional view of the joystick attachment in use with the game-pad and arrow key of the keypad;

FIG. 5 is a rear view of the keypad of FIG. 1;

FIG. 6 a front view thereof;

FIG. 7 is a left side view thereof;

FIG. 8 is a right side view thereof;

FIG. 9 is a detail view, in cross section, showing one of the two-piece adjustable legs of the keypad of the invention;

FIG. 10 is a side view showing the folding up of the keypad;

FIG. 11 is a plan view showing a set-top box converter that may be coupled to the keypad of the invention via an interface cord;

FIG. 12 is a plan view of a second embodiment of the invention with the foldable keyboard of FIG. 1 being provided with a split screen, one screen pivotally mounted to one half of the keyboard;

FIG. 13 is a front view thereof, showing the battery compartment and infrared or IF sensor;

FIG. 14 is a rear view thereof;

FIG. 15 is a left side view thereof;

FIG. 16 right side view thereto;

FIG. 17 is a detail view, in cross section, showing one of the two-piece adjustable legs of the keypad of the invention;

FIG. 18 is a detail view of the swivel mount thereof for mounting a monitor;

FIG. 19 is a perspective view of a third embodiment of the invention showing a tri-sectioned split screen having its own microprocessor for one or more of the three sections of the split screen, in combination with a fax/scanner/printer device;

FIG. 20 is a top view thereof;

FIG. 21 is a rear view thereof;

FIG. 22 is a right side view thereof;

FIG. 23 is a left side view thereof;

FIG. 24 is a detail view of the various input ports thereof; and

FIG. 25 is a perspective view of the RF stylus pen thereof.

DETAILED DESCRIPTION OF THE INVENTION

Referring now to the drawings in greater detail, and to FIGS. 1 through 11, the foldable, portable retrofitting computer keyboard of the invention is indicated generally by reference numeral 1 with its own built-in carrying case. The keyboard 1 in one first embodiment does not have its own, dedicated, microprocessor, and in a second embodiment does have its own dedicated microprocessor for accessing the Internet, as described hereinbelow. The keyboard 10 is made up of two halves 1', 1" pivotally mounted together by hinges 2, whereby the entire keyboard may be folded up for compact storage and handling, with the halves retained closed via a conventional catch and release mechanism 3. Each half of the keyboard 1 is capable of being coupled to a standard notebook computer. Each half of the keyboard has standard-sized, enlarged keys, whereby after being coupled to a notebook computer, the keyboard retrofits the notebook computer to a device that has enlarged, standard-sized keys for easier use thereby. The layout of the keys on the two halves is such as to provide an ergonometric efficient keyboard, based on the Dvorak or Multilingual styles of keypads.

The keyboard 1 is provided with many enhanced features. The keyboard 1 has a touch pad or track ball pointing device 4, a touch-sensitive LCD screen 5 for bringing up various macro-functions, macro-switch buttons 6, a programmable backspace/space bar key 7, home/end, insert/delete buttons 8, flip-up wrist and storage compartments 9, forward space key 10, a combination arrow-keys and game pad 11, extended "WINDOWS 95" keys 12, a keyboard deck-elevation adjustment button 13, battery-power indicator light 14, on/off switch 15, rechargeable battery packs 29, PCMCIA bay or similar input device 30, a universal expansion bay 36, infrared or IF sensors 46, and fold-down, rubber-mast antennae/signal booster 47. The keyboard also has its own joystick attachment 16, as best seen in FIG. 2. The joystick attachment 16 has a plunger or actuator 17 with an enlarged head 18 serving as the firing button. The plunger is retained in place by retaining clips 19 mounted inside the attachment-housing. A recoil spring 20 is telescopingly mounted about the plunger for returning the firing button and plunger to its original position. The spring is mounted between two retaining clips 19. The bottom or lower end of the plunger has a contact point 21 that actually opens and closes a circuit for the firing circuit when using the joystick attachment 16. A directional-arrow surface 22 (FIG. 3) on the upper face of the game-pad/arrow keys section 11 of the keyboard indicates direction, as seen in FIG. 4 forming part of the game pad and arrow keys section 11 of the keyboard. The joystick attachment 16 is held in place on the keyboard via a nut 23 cooperating with a threaded section 36 of the housing of the joystick attachment 16, as seen in FIG. 4. The lower contact point makes electrical contact with conventional firing circuitry of a joystick-attachment motherboard 37 underneath the gamepad/arrow keys section 11 of the keyboard. The joystick attachment 16 may then be used for controlling functions on an notebook computer coupled to the keyboard 1.

The keyboard, when used for Internet accessing, and with is own microprocessor, may also have a set-top box converter actually contained wholly therein, such making the unit a portable unit with its own set-top box converter, allowing the access to the Internet thereby with any television or monitor at the premises. Referring now to FIGS. 5–11, various hardware components of the keyboard 1 are shown. In FIGS. 5–8, there are shown a conventional quick-connect parallel port connection 25, a conventional quick-connect parallel port pass-through 26, power-cord output 27, two-piece, height-adjustable supporting legs 28, a phone-jack 37, rear-mounted infrared or IF sensors for wireless communication with a set-top box converter when the keyboard 1 has its own dedicated microprocessor for connection to the Internet. A fold-down, rubber-mast antenna 47 is also provided. Removable, rechargeable battery packs 29 are also provided as seen in FIG. 6, and a PCMCIA slot 30 as seen in FIG. 7. Power cord input 31, standby button 32, and the universal expansion bay 36 are shown in FIG. 8. FIG. 9 shows the details of each height-adjustable leg 28. Each leg has an upper height-adjustment screw 29' for the upper part of an inner leg section 34 to the bottom of which is secured a rubber, nonskid pad 35. The leg 28 is hinged to the keyboard by hinges 33 for storing. FIG. 10 shows the keyboard in its partially folded state, with the legs 28 not yet laid flat. FIG. 11 shows a conventional set-top converter box unit 38 that has an infrared or RF sensor 39 and indicator window 40 for communicating with the similar part 46 of the keyboard 10, when the keyboard 10 has its own, dedicated microprocessor for use on the Internet, a power button 41, channel-up button 42, channel-down button 43, non-skid feet 44, and a monitor or television interface cord 45.

The folding, portable, expansion keyboard device 1 is intended not only for notebook computers, but also desktop computers. Moreover, this keyboard, when unfolded, is about twice the size of an existing notebook computer in order to double the space available for various internal components, but when folded, it is smaller than notebook computer.

As previously stated, the basic foldable keyboard 1 offers many unique features and benefits to the computer user, such as comfort, portability and extended battery life, among others. The keyboard system 1 also offers several other unique and notable features, such as expansion ports 36, to allow expansion. For example, expandability will allow the user to expand both their desktop and notebook with the same device thus allowing for greater economy. One could buy one modem, one SCSSI adapter, etc., and use them in both the desktop and the laptop, which is much easier for an owner of a desktop computer to plug in an expansion module into the keyboard 1 than it is to open up the case and try to install a PC card in a slot. The keyboard 1 also has the side-mounted serial port 30 for adding additional pointing devices such as an artists digitizing tablet and stylus, a standard mouse, etc.

An upgrade to the keyboard system 1 is its use as the above-mentioned Internet browser, which is a transportable Internet browser device appliance. This Internet browser utilizes the aforementioned expansion space to allow for the addition of the necessary hardware that would normally reside in a conventional stationary set-top box, i.e. the modem, motherboard, non-volatile memory, and other miscellaneous hardware. In other words, this arrangement not only offers the user the ability to surf the net while utilizing a superior keyboard interface layout, but also allows for the ability to move about the house to various TV sets, that are equipped with the necessary scan signal converter boxes. This layout offers obvious benefits and convenience to the end-user, much like a cordless phone offers mobility without the attached cord. To be specific, this system houses all the required telecommunications hardware, and the set-top box will basically be a signal converter that will sit atop the TV set to process the data and then convert it into a video signal. A variation is that the set-top box houses the necessary Internet browsing hardware and interfaces with the set-top box as a remote device, and will remotely process the data and convert it to a video signal, from the game module, as described below.

As previously stated, the keyboard system when used as an Internet browser device, houses all the necessary components required to access the Internet, but, since the unit will connect to multiple TV monitors, it is necessary to employ a set-top box to convert the data stream into an image on the screen. The set-top box will function much like a standard scan converter box that is currently commercially available. The main distinction is that the unit will receive the signals from the keyboard system 1 wirelessly, and also can be directly connected via a cable connection in order to create the appropriate images. The set-top box will be a modular piece of hardware in that it will be itself expandable. It is also noted that the Internet browser of the present invention will allow for expandability of the units to incorporate any of the current and upcoming connectivity technologies, i.e., ISDN lines, cable modems, satellite modem connections, and standard telephone lines. The scan converter will be integrated thereinto. A wall-mounted central computer will serve as a large-screen folding LCD TV-monitor, that offers double the screen area of traditional large-screen TVs. More importantly though, the system will also serve as a hub of the Intranet home network. This design will eliminate the need for an external set-top box.

Another upgrade is the addition of a game module and CD ROM or DVD module that will simply plug into one of the open universal expansion bays. It will also require the installation of the necessary video card and chip inside the left bay of the case itself. This will allow the user to play video games anywhere in the house with the aforementioned scan signal converter boxes. The system will use existing available hardware for processing the game data, such as the: "SONY PLAY STATION", the "SEGA SATURN", and the "3-DO" engine. All of these platforms use a CD-ROM to send the data to the video card. The advantage to all of this is that the game player can move the game device from one room to the other without interrupting the game play, instead of being limited to one set.

A variation of the keyboard system 1 is that the keyboard may have its keys mounted on removable, interchangeable pods or slabs. These separate key-pods will be offered in all the alphabets used in the various languages of the world. For example, a business person needing to travel to Japan and does not speak Japanese, could simply purchase an additional keyboard 1, refit the unit with the Japanese character key-pod and utilizing conventional translation software, could communicate effectively and more importantly privately with the other person without speaking the foreign language. This expandability or inter-changeability will allow one to also serve many users of many dialects. There is also the availability to provide a transcript of the discussions since the content can be saved to the hard drive and printed out later. There will also be a video editing pod option, that will allow a user to assemble video footage and edit with the use of the one board. These pods will feature the necessary fade slides and switches found on current editing boards.

A further extension of the units case design, offers the opportunity for a user to make contact anywhere on earth. As mentioned, the case design offers double the case-size for the motherboard, expansion ports, and game modules, which means it will also allow for a satellite-receiver module. The fact that the units employ either two or three screens, that offers the perfect opportunity to affix the required satellite sails to the back of these monitors. This offers a connection for voice or data including video footage, anywhere on the globe. This satellite-expansion feature is only feasible as one unit, due to the fact that the back of the dual screens and the triple screens (as described hereinbelow) will serve as the housing to mount the optional satellite sails to. This is made even more unique by the fact that the monitors will serve as a graphical signal strength meter allowing the user to position them for the best signal, and, since the screens do detach, any signal position can be attained while using the other screen as a monitor. This may also serve as a Global Positioning System or G.P.S. unit that cites the position of the keyboard terminal anywhere in the world. Also, via mapping software, the user can overlay his current location on topographical maps, including longitude and latitude coordinates. The benefits to sailors alone, would be immeasurable.

Referring now to FIGS. 12 through 18, there is shown another embodiment of the invention incorporating the split keyboard 1. In this version, the keyboard is combined with its own dedicated microprocessor for serving as a self-contained notebook computer with split screen. As can be seen in FIG. 12, this embodiment 100 includes a split keyboard 102 similar to that of FIG. 1., and a dual LCD display or split screen 101, with each section being pivotally attached to a keyboard half-section. Each half of the split screen is independently, pivotally mounted so that each may be moved separately. The notebook computer also has three universal expansion bays 104, removable, rechargeable battery packs 105, a split-front infrared or IF sensor 106, as described above for the first embodiment of FIG. 1, a set of indicator lights 107, a mini LCD status/touch sensitive screen 108, a PCMCIA expansion slot 109, a read-write CD/DVD device 110, a flip-up storage compartment 111, a retractable cellular antenna 112, and a pop-up keyboard light with a built-in copy holder 113, a DC power source/charging cord 114, a docking-port input 115, a PS/2 mouse port 116, a joystick-port 117, S-video output 118, an NTSC video-output port 119, a quick-connect parallel port 120, a serial port 121, an external monitor output-port 122, a microphone in, audio out and line-out 123, power on/off button 124, a reset button 125. The notebook computer 100 has the same type of leg-support as seen in FIG. 17 as the first embodiment, namely it has outer support legs 126, inner legs 127, nonskid rubber feet 128, height-adjustment screws 129 and mounting hinges 130. The notebook computer 100 has the same type of monitor support arm, as seen in FIG. 18, as that of the first embodiment, namely a connecting arm-mount 131, computer deck 132, universal joint 133 for a monitor 134. The notebook computer 100 has at least one microprocessor, and preferably has a second dedicated microprocessor associated with half of the keyboard for playing games, as described above with reference to the first embodiment of FIG. 1. Thus, one half of the split-screen 101 may be used for normal computer functions, such as word processing, by means of the first microprocessor, whereas the second half of the split screen 101 may be used for playing video games via the dedicated game-microprocessor, such as "NINTENDO", or the like, via the read-write CD-ROM/DVD device 110.

The system 100 features all of the aforesaid benefits of the system 1, with the additional features of: a motherboard and chip, a hard drive, and dual screen monitors that are used as one large monitor, as described above, which, together, create a portable web-browsing, notebook computer with a full size keyboard, featuring the unique key arrangement. This system 100 offers the user a minimum 18" screen-area. This provides for the only portable, 32-bit RISC processor, powered game-device. The aforementioned screens are mounted to the folding keyboard module with two unique universal joints (U-joint) described above, that allow for the necessary screen adjustments to compensate for the rise of the keyboard base. The dual screens 101 are capable of being rotated 360 degrees. The screens also have the ability to detach from the base. This ability to detach the screens will allow the user to set the screen at a desired viewing location/proximity from the user. This will also allow for the use of one of the monitors when detached from the base to serve as a LCD projection panel for presentations, while the other monitor can remain attached to the base and serve as a teleprompter displaying user-notes. The dual screens have interior edges that allow the screen itself to wrap in a bull-nose fashion, to eliminate a line or border between the screens of a dissimilar material. In other words, there will be no visible line of black plastic between where the two screens come together. By using a basic keyboard 1, and exchanging the standard key-pods for one of the multilingual key-pods, one then may simply rotate one of the screens 180 degrees toward the person sitting across from him. Then, by using conventional language translation software, one may carry on a conversation with someone in a foreign language by simply typing in English, which will show up on the other screen in the selected dialect, thus serving as a portable translating device.

The dual screens also serve to enhance the game playing experience. For example, while in two-player mode on most game systems such as the aforementioned SONY PLAY STATION, the single screen of a conventional TV set is graphically divided in half, thus enabling the two players to play simultaneously in the same gaming environment. This can get somewhat confusing and also drastically impairs the enjoyment of the game due to the reduced screen size for each individual player. This is not the case with the dual screens of the system 100. Furthermore, the dual screens will allow for privacy in the gaming experience. In other words, the unit will allow for games like poker, for example, where each needs to maintain secrecy such as a hand in a card game. The dual screens will provide just such privacy.

The ultimate extension of the dual screen for gaming mode and any multimedia experience, is that, with the angling of the screens toward one another, one can create a pseudo-virtual reality panoramic experience. This will allow the gaming experience to utilize peripheral vision, in that objects can come from the sides of the screens and move towards the center.

Referring now to FIGS. 19–25, there is shown a triple, split-screen, self-contained portable computer 201 having its own CPU mounted in the center screen, with a portable, removable combined printer/keyboard/scanner/fax and copier module unit 202. The triple, split-screen, self-contained portable computer 201 has side monitor catch and release mechanisms 203 for retaining the side monitor screens 204 in its folded-up state when folded toward each via other via hinge-mounts 216 over the main center monitor-screen 215. The triple, split-screen, self-contained portable computer 201 also has internal stereo speakers 205, a front infrared or IF receiving window 206, a pop-up read-write CD-ROM/DVD module 213, a retractable antenna 214, a PCMCIA bay 217, power on/off button 235, rechargeable battery packs 218 (FIG. 21), a universal expansion bay 219 (FIGS. 22 and 23). The combined module unit 202 has system indicator lights 207, a universal expansion bay 208, function-buttons 209 for the printer-functions aspect of the combined unit 202, a paper output-path 211, and a lift-up printer cartridge door 212.

Referring to FIG. 24, there is shown a close-up of the input/output expansion ports located on the back of the combined monitor/CPU. A microphone input/output line and headphone jacks 220 are provided, along with a PS/2 mouse port 221, a keyboard port 222, a quick-connect parallel port 223, an external monitor port 24, a serial port 225, a docking port 226, an S-video output port 227, and an NTSC video output 228.

FIG. 25 shows an electronic stylus pen 229 for use with the triple, split screen computer 201. The electronic stylus pen has a pocket-clip 230 for easy storage, a single-click button 231, a double-click button 232, a removable battery cover 233, and a a replaceable plastic pen-tip 234. The stylus pen is used in conjunction with the split screen, in the well-known manner. The triple-slit screen allows three, independent programs to be run simultaneously on the computer for simultaneous viewing.

What I claim is:

1. In a portable, notebook or portable computer having a main frame comprising an upper surface upon which is provided a keypad, the improvement comprising:

display-screen means pivotally mounted to said main frame, said display-screen means comprising a pair of independently mounted screen-halves;

mounting means for independently pivotally mounting said screen-halves to said main frame; said mounting means comprising a first portion for pivotally mounting a first said screen-half to a first section of said main frame in a first direction, and a second portion for pivotally mounting a second said screen-half to a second section of said main frame in said first direction, said mounting means allowing said screen-halves to pivot independently of each other in an upward direction for display, and in a downward direction for abutting contact against said upper surface of said main frame for storage and transport;

said mounting means also comprising a at least one joint means for said first portion of said mounting means for allowing said first said screen-half rotation in a second direction perpendicular to said first direction when said first screen-half is pivoted in said upward direction.

2. The portable, notebook or portable computer according to claim 1, wherein said mounting means comprises a first and second joint means, each of said first and second joint means comprising a universal joint allowing a full 360-degree rotation for each said screen-half.

3. The portable, notebook or portable computer according to claim 1, wherein said at least one joint means allows said at least one screen-half at least 180 degrees rotation.

4. In a portable, notebook or portable computer having a main frame comprising an upper surface upon which is provided a keypad, the improvement comprising:

said main frame comprising a first half and a second half, said first and second halves being pivotally connected to each other, said main frame comprising medially-mounted, first pivot-mounting means for pivotally mounting said first and second halves, whereby the main frame may be folded for convenient storage, and unfolded for use;

display-screen means mounted to said main frame, said display-screen means comprising a pair of independently mounted screen-halves;

second mounting means for mounting said screen-halves to said main frame; said second mounting means comprising a first portion for pivotally mounting a first said screen-half to a first section of said main frame, and a second portion for mounting a second said screen-half to a second section of said main frame, said first and second portions of said second mounting means allowing said first screen-half to pivot independently of the other said screen-half in an upward direction for display, and in a downward direction for abutting contact against said upper surface of said main frame for storage and transport;

said second mounting means also comprising a joint means for at least said first portion of said second mounting means for allowing the first said screen-half rotation in a direction transverse to said upward direction when said first screen-half is pivoted in said upward direction.

* * * * *